(12) United States Patent
He et al.

(10) Patent No.: US 9,097,603 B2
(45) Date of Patent: Aug. 4, 2015

(54) VIBRATION EXCITER SYSTEM WITH A FEEDBACK CONTROL UNIT BASED ON AN OPTICAL LINEAR ENCODER

(75) Inventors: Wen He, Hangzhou (CN); Chunyu Wang, Hangzhou (CN); Runjie Shen, Hangzhou (CN); Shushi Jia, Hangzhou (CN); Mei Yu, Beijing (CN); Mingde Ma, Beijing (CN)

(73) Assignees: ZHEJIANG UNIVERSITY, Hangzhou, Zhejiang Province (CN); NATIONAL INSTITUTE OF METROLOGY P. R. CHINA, Beijing (CN)

( * ) Notice: Subject to any disclaimer, the term of this patent is extended or adjusted under 35 U.S.C. 154(b) by 232 days.

(21) Appl. No.: 13/821,835

(22) PCT Filed: May 3, 2012

(86) PCT No.: PCT/CN2012/075022
§ 371 (c)(1),
(2), (4) Date: Mar. 8, 2013

(87) PCT Pub. No.: WO2012/149896
PCT Pub. Date: Nov. 8, 2012

(65) Prior Publication Data
US 2013/0162179 A1 Jun. 27, 2013

(30) Foreign Application Priority Data
May 4, 2011 (CN) .......................... 2011 1 0115072

(51) Int. Cl.
G01M 7/02 (2006.01)
H02P 25/02 (2006.01)

(52) U.S. Cl.
CPC ............. G01M 7/022 (2013.01); H02P 25/027 (2013.01)

(58) Field of Classification Search
CPC .............................. G01M 7/022; H02P 25/027
USPC .................................................. 73/663, 664
See application file for complete search history.

(56) References Cited

U.S. PATENT DOCUMENTS

| 5,565,623 A * | 10/1996 | Philpott et al. ................. 73/105 |
| 2009/0076768 A1* | 3/2009 | Seo ................. 702/150 |
| 2009/0182521 A1* | 7/2009 | Sill et al. ................. 702/104 |

FOREIGN PATENT DOCUMENTS

| CN | 1955644 A | 5/2007 |
| CN | 101342528 A | 1/2009 |

(Continued)

OTHER PUBLICATIONS

Shipin Yu, Application of BP neutral networks in electro-hydraulic shaking table control system, Chinese Hydraulics & Pneumatics, 2008, No. 7, pp. 53-55, ISSN1000-4858.

(Continued)

*Primary Examiner* — Laura Martin
*Assistant Examiner* — Rose M Miller
(74) *Attorney, Agent, or Firm* — Jacobson Holman PLLC; Jiwen Chen (57) ABSTRACT

The vibration exciter system with a feedback control unit based on an optical linear encoder includes a vibration exciter, a signal generator and a power amplifier. The exciter system further comprises an optical linear encoder converting the displacement of moving component of the exciter into A/B pulse with a phase difference of 90°, a filtering, shaping and level translator unit converting the A/B pulse into standard pulse with standard shape and level, a subdivider and orientation recognizer unit refining standard pulse and recognizing the moving orientation, an analog converter unit converting refined standard pulse into analogue signal that reflects the displacement of the moving component. The standard signal outputted by the signal generator and the converted analogue signal are inputted into a subtracter as the minuend and subtrahend respectively. The output of the subtracter is inputted into the power amplifier and then into the vibration exciter as a driving signal.

8 Claims, 5 Drawing Sheets

(56) References Cited

FOREIGN PATENT DOCUMENTS

| | | |
|---|---|---|
| CN | 101741318 A | 6/2010 |
| CN | 101806617 A | 8/2010 |
| CN | 201666816 U | 12/2010 |
| CN | 102288282 A | 12/2011 |
| CN | 202133463 U | 2/2012 |
| JP | 57-8815 A | 1/1982 |
| JP | 2002-113420 A | 4/2002 |
| JP | 2002-113421 A | 4/2002 |

OTHER PUBLICATIONS

Liyan Jiang, Circuit design of grating signal processing based on FPGA, Tool Engineering, 2010, vol. 44, No. 5, pp. 100-102, ISSN 1000-7008.

Hongbo Hu, Study on displacement feedback control technique of low frequency vibration, Measurement Technique, 2008, No. 9, pp. 28-31, ISSN1000-0771.

* cited by examiner

VIBRATION EXCITER SYSTEM WITH A FEEDBACK CONTROL UNIT BASED ON AN OPTICAL LINEAR ENCODER

This is a U.S. national stage application of PCT Application No. PCT/CN2012/075022 under 35 U.S.C. 371, filed May 3, 2012 in Chinese, claiming the priority benefit of Chinese Application No. 201110115072.7, filed May 4, 2011, which is hereby incorporated by reference.

FIELD OF THE INVENTION

This present invention relates to a vibration exciter system with a feedback control unit based on an optical linear encoder.

BACKGROUND OF THE INVENTION

New requirements for the working frequency range of vibration sensors are constantly raised with the development of science and technology. Vibration sensors with a lower-limit working frequency lower than 0.05 Hz began to be widely adopted in the fields of aeronautics and astronautics, weapon guidance, earthquake prediction, ultra-precision manufacturing, mineral exploration, etc. The appearance of these sensors sets higher requirement for ultralow frequency measurement and calibration systems.

According to the national metrological verification regulations of China (JJG 134-2003, JJG 233-2008), the vibration sensor should be calibrated by the metrological administrative department before delivery or after being used for a period of time (usually every one year). Vibration sensors are usually calibrated through a standard vibration device, which generates standard horizontal or vertical sinusoidal vibration in the calibration system. The primary calibration and secondary calibration methods are used to calibrate the sensor to get its various indicators. The accuracy of the output waveform of the standard exciter determines the calibration accuracy of the sensor.

The amplitude of the output velocity, acceleration signal of the vibration exciter is small and the signal-to-noise ratio is low at a low frequency and especially at an ultralow frequency. In addition, under the condition of equal voltage input, the exciters exhibit displacement characteristics at the low frequency. Generally, the displacement sensor is frequently adopted as the measurement and feedback control device. However, common displacement sensor has low precision and special contact-type displacement sensor with high precision would cause friction and tension to the moving component of exciter. Such traditional displacement sensor cannot be used in the control system of metrological standard vibration exciter.

SUMMARY OF THE INVENTION

In order to overcome the shortcomings of the prior art, such as low precision of the displacement sensor or low precision of the vibration exciter during operation caused by friction of the displacement sensor, the present invention provides a highly precise vibration exciter system with a feedback control unit based on an optical linear encoder.

The vibration exciter system with a feedback control unit based on an optical linear encoder comprises a vibration exciter, a signal generator and a power amplifier;

Its characteristics are as follows. The vibration exciter system also comprises an optical linear encoder converting the displacement of the moving component of exciter into A/B pulse with a phase difference of 90°, a wave filtering, shaping, and level translator unit converting the output pulse signal of the optical linear encoder into standard pulse with standard shape and level, a subdivider and orientation recognizer unit refining the standard pulse and recognizing the moving orientation of the system being measured, a analog converter unit converting the refined standard pulse into analogue signal whose voltage is in proportion to the current displacement of the moving component.

The standard signal outputted by the signal generator and the converted analogue signal are imported into a subtracter. The standard signal is the minuend and the analogue signal is the subtrahend.

The output of subtracter is imported into the power amplifier. The driving signal outputted by the power amplifier is inputted into the vibration exciter.

In addition, a PID controller is adopted between the subtracter and the power amplifier. A proportional amplifier is adopted between the analog converter unit and the subtracter.

In addition, the method of the subdivider and orientation recognizer unit to determine the moving orientation of the system being measured is as follow: when phase A leads phase B, the moving orientation of the exciter is set as positive; when phase A follows phase B, the moving orientation of the exciter is set as negative.

Further, for a short-stroke exciter, where the moving component is longer than the maximum stroke of the exciter along the moving direction, the scale of the optical linear encoder is installed on the moving component of the exciter and the reading head of the optical linear encoder is installed on the fixed base of the exciter.

For a long-stroke exciter, where the moving component is shorter than the maximum stroke of the exciter along the moving direction, the scale of the optical linear encoder is installed on the fixed base of the exciter and the reading head of the optical linear encoder is installed on the moving component of exciter.

In addition, on one side of the scale of the optical linear encoder is installed a reference mark actuator that provides the measurement reference for the measurement of the exciter displacement.

Further, on the other side of the scale of the optical linear encoder are installed a first limit switch actuator and a second limit switch actuator to ensure that the exciter will not go beyond the safety limits.

The working principle of the present invention is as follow: the optical linear encoder outputs two pulses (phase A and B) with a phase difference of 90°. A/B pulse is then processed through the wave filtering, shaping and level translator unit and the pulse is converted into a standard pulse signal with standard shape and level. Then the standard pulse signal's frequency is multiplied by four and the moving orientation is also recognized. Then the refined standard pulse is converted into an analogue signal with the method such as reversible pulse count and D/A conversion, etc. The voltage is in proportion to the measured displacement. The analogue signal is amplified through the proportional amplifier and is then compared with the standard signal outputted by the signal generator to calculate the deviation. The outputted deviation is processed through the PID controller. The outputted control signal is then inputted into the power amplifier and is used to drive the exciter to rectify the deviation. Then the output displacement of the exciter can follow the inputted standard signal. When the signal generator outputs a standard sinusoid signal with a minimum harmonic distortion, the exciter also outputs the displacement signal with a minimum harmonic distortion. Thus, the aim to improve the precision of the exciter output waveform can be realized.

The present invention makes full use of the characteristic of optical linear encoder, such as the advantages of high precision, non-contact measurement and flexibility in processing its output signal. The optical linear encoder is then adopted in the feedback controller of the exciter through converting the AB pulse into analogue signal that reflects the displacement of moving component. Such feedback control system ensures significant improvement of the accuracy of the exciter output waveform, especially for low-frequency vibration.

The present invention makes full use of the characteristic of optical linear encoder, such as the advantages of high precision and non-contact measurement. The optical linear encoder is then adopted in the feedback controller of the exciter through the process of its output signal. Such feedback control system improves the operation precision of the exciter. The technology adopted in the present invention is mature and is easy to be realized. The optical linear encoder is also convenient to be installed.

DETAILED DESCRIPTION OF THE INVENTION

Hereinafter, embodiments of the present invention will be described with reference to the accompanying drawings.

Embodiment 1

Figure 1:
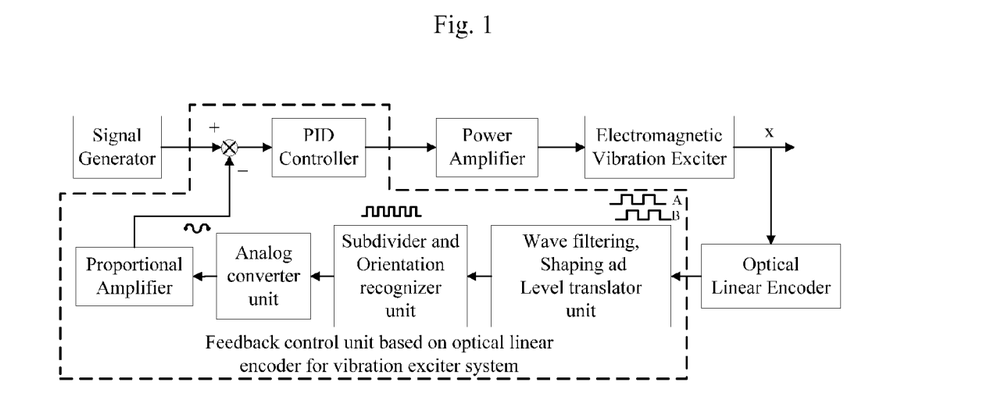
FIG. 1 is a structure diagram of a vibration exciter system with feedback control unit based on an optical linear encoder.

Referring to FIG. 1-4, the vibration exciter system with a feedback control unit based on an optical linear encoder comprises a vibration exciter, a signal generator and a power amplifier;

The exciter system also comprises an optical linear encoder converting the displacement of the moving component of exciter into A/B pulses with a phase difference of 90°, a wave filtering, shaping, and level translator unit converting output pulse signal of the optical linear encoder into standard pulse with standard shape and level, a subdivider and orientation recognizer unit refining the standard pulse and recognizing the moving orientation of the system being measured, a analog converter unit converting the refined standard pulse into analogue signal whose voltage is in proportion to the current displacement of the moving component.

The standard signal outputted by the signal generator and the converted analogue signal are imported into a subtracter. The standard signal is the minuend and the analogue signal is the subtrahend.

The output of subtracter is imported into the power amplifier. The driving signal outputted by the power amplifier is inputted into the vibration exciter.

In addition, a PID controller is adopted between the subtracter and a power amplifier. A proportional amplifier is adopted between the analog converter unit and the subtracter.

In addition, the method of the subdivider and orientation recognizer unit to determine the moving orientation of the system being measured is as follow: when phase A leads phase B, the moving orientation of the exciter is set as positive; when phase A follows phase B, the moving orientation of the exciter is set as negative.

Further, for a short-stroke exciter, where the moving component is longer than the maximum stroke of the exciter along the moving direction, the scale of the optical linear encoder is installed on the moving component of the exciter and the reading head of the optical linear encoder is installed on the fixed base of the exciter.

In addition, on one side of the scale of the optical linear encoder is installed a reference mark actuator that provides the measurement reference for the measurement of the exciter displacement.

Further, on the other side of the scale of the optical linear encoder are installed a first limit switch actuator and a second limit switch actuator to ensure that the exciter will not go beyond the safety limits.

The structure of the present invention is shown in FIG. 1 and its working process is as follow: the optical linear encoder outputs two pulses (phase A and B) with a phase difference of 90°. A/B pulse is then processed through the wave filtering, shaping and level translator unit and the pulse is converted into a standard pulse signal with standard shape and level. Then the standard pulse signal's frequency is multiplied by four and the moving orientation is also recognized. Then the refined standard pulse is converted into an analogue signal, whose voltage is in proportion to the measured displacement. The analogue signal is amplified through the proportional amplifier and is then compared with the standard signal outputted by the signal generator to calculate the deviation. The outputted deviation is processed through the PID controller. The outputted control signal is then inputted into the power amplifier and is used to drive the exciter to rectify the deviation. Then the output displacement of the exciter can follow the inputted standard signal. When the signal generator outputs a standard sinusoid signal with a minimum harmonic distortion, the exciter also outputs the displacement signal with a minimum harmonic distortion. Thus, the aim to improve the precision of the exciter output waveform can be realized.

The present invention converts the A/B pulse into an analogue signal that reflects the displacement of the moving component of the exciter. The optical linear encoder is used in the displacement feedback control system of the exciter to improve the operation precision of the exciter.

Figure 2:
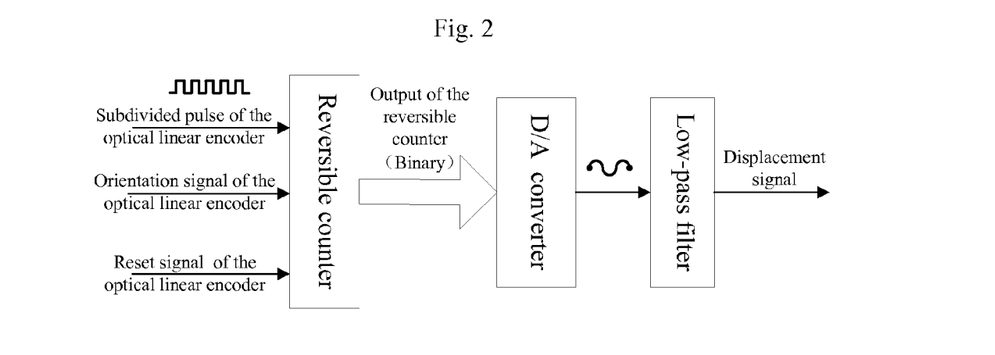
FIG. 2 is a structure diagram of the analog converter unit for the pulse signal of the optical linear encoder.

The working principle of the present invention is as follow: during the operation of the exciter, the optical linear encoder outputs two pulses (phase A and B) with a phase difference of 90°. A/B pulse is then processed through the wave filtering, shaping and level translator unit and the pulse is converted into a standard pulse signal with standard shape and level. Then the standard pulse signal is processed through the subdivider and orientation recognizer unit. The moving orientation is recognized as follow: when phase A leads phase B, the moving orientation of the exciter is set as positive and the orientation signal is set as high level; when phase A follows phase B, the moving orientation of the exciter is set as negative and the orientation signal is set as low level. In addition, phase A pulse and phase B pulse have a phase difference of 90° and the output standard pulse frequency is multiplied by four. The resolution of the optical linear encoder is improved further. Then the refined standard pulse and the orientation signal are inputted into a reversible counter and the D/A converter. Then the corresponding analogue signal is produced. Its specific process is shown in FIG. 2 and is stated as follow: a 16-bit reversible counter is reset when the moving component passes the reference mark actuator. The initial value of the counter should be chosen properly to ensure the corresponding analogue output is zero volt. In this embodiment, the digital input FFFF (hexadecimal number) is inputted into the D/A converter, the corresponding analogue output is 10V; when the input is 0000 (hexadecimal number), the corresponding analogue output is −10V. Thus, the initial value of the counter is set as 8000 (hexadecimal number). Then the system begins to run. When the orientation signal is at a high level, which indicates positive movement of the moving component, the counter counts plus 1; on the contrary, the counter counts minus 1. The analogue signal output of D/A converter goes through a low-pass filter to remove its high-frequency noise. The analogue signal is in a proportional relationship with the displacement signal.

The converted analogue signal of the optical linear encoder is amplified through a proportional amplifier and converted into a properly sized displacement feedback signal. Then such signal is compared with the standard signal of the signal generator to calculate the deviation through a subtracter. The deviation exported from the subtracter is processed through a PID controller. The output control signal is then amplified through the power amplifier and is used to drive the exciter to rectify the deviation. Then the output displacement of the exciter can follow the input standard signal.

Figure 3:
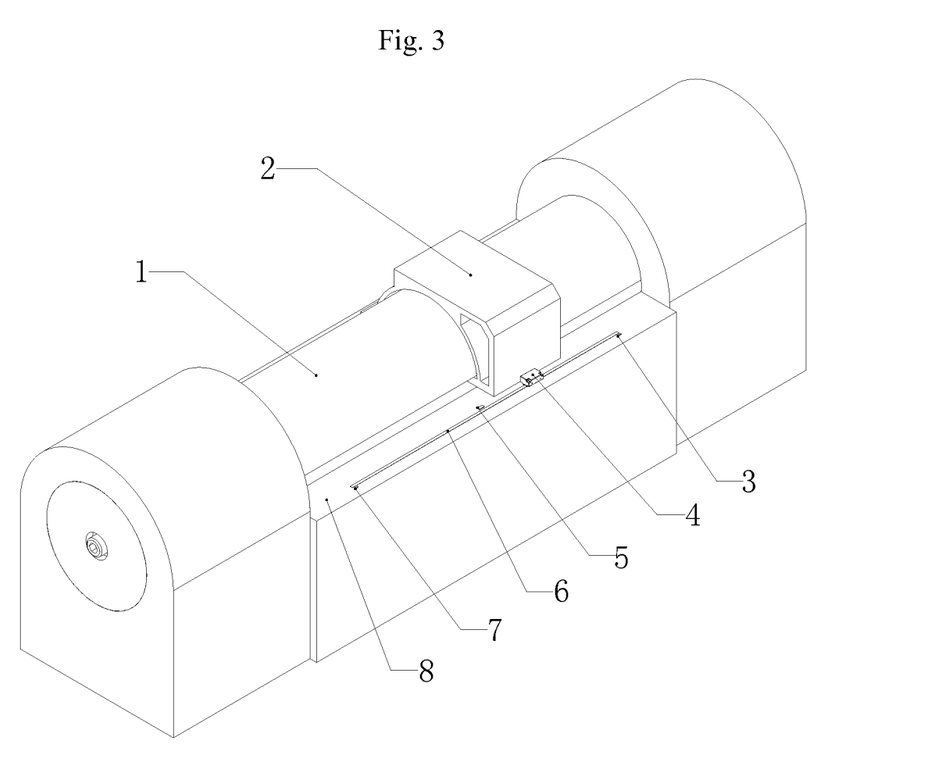
FIG. 3 is an installation drawing of the optical linear encoder in the long-stroke horizontal vibration exciter.
Figure 4:
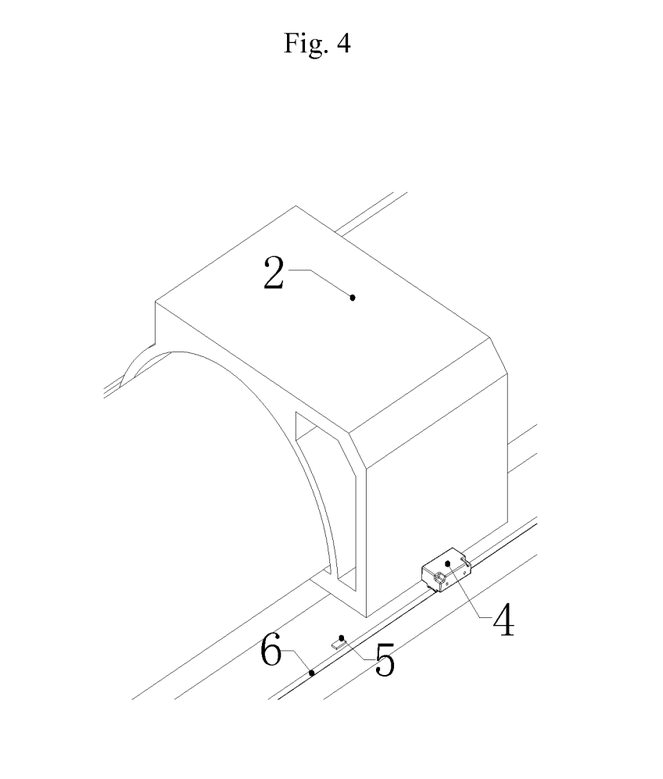
FIG. 4 is a partial cutaway enlarged view of FIG. 3 showing the installation of the optical linear encoder.

The optical linear encoder can be installed in the long-stroke horizontal vibration exciter as shown in FIG. 3. For a long-stroke exciter 1, a reading head 4 of the optical linear encoder is connected with a moving component 2 and a scale 6 is installed on the surface of the exciter body or a slider rail 8, which both are the fixed base of the exciter 1. The installation surface of the scale should be flat. A second limit switch actuator 7, a first limit switch actuator 3 and a reference mark actuator 5 are respectively installed on the two sides of the scale 6. The installation should ensure that the sensing portion of the reading head 4 is located above the scale 6 during the whole stroke of the exciter. The scale 6 is required to be strictly in parallel to the movement track of the moving component 2. The second limit switch actuator 7, the first limit switch actuator 3 and the reference mark actuator 5 are positioned properly to ensure that they can be sensed by the reading head 4 and when being sensed, the moving component is exactly located at the left limit, right limit and zero positions, respectively. In addition, the reading head 4 can also be connected with the moving component 2 through a bracket. The bracket should be rigid enough to avoid any shaking The direction of the reading head 4 can also be adjusted precisely through the bracket within a certain limit in order to improve the measurement accuracy of the optical linear encoder. At the same time, when designing the installation structure, attention should be paid to protection of the optical linear encoder during the operation of the exciter and to prevent any collision or pollution of the reading head and the scale, etc. The partial cutaway enlarged drawing showing the installation of optical linear encoder is shown in FIG. 4 schematically. This drawing only indicates the installation of the optical linear encoder. A special installation structure should be designed according to the requirement of special vibration exciter.

Embodiment 2

Figure 5:
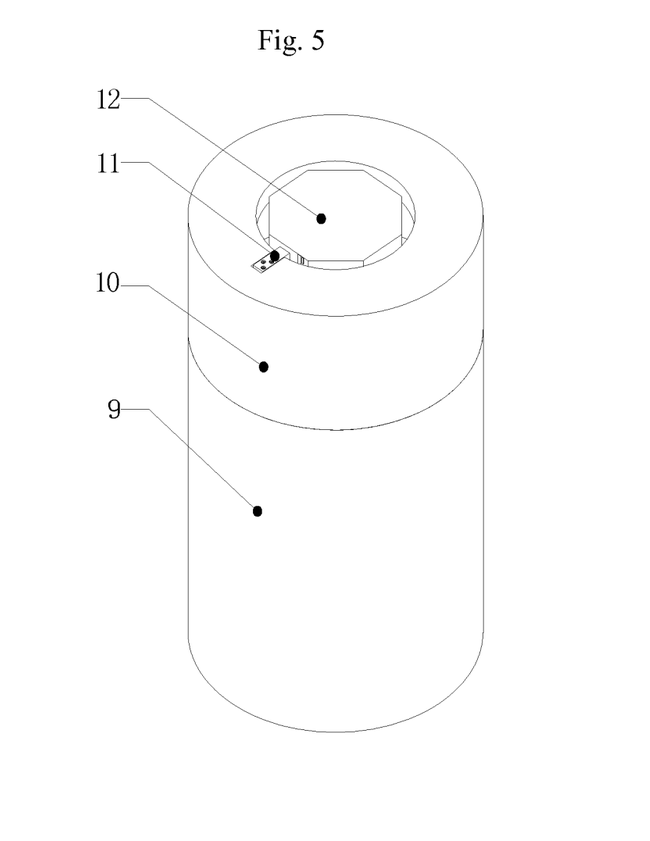
FIG. 5 is an installation drawing of the optical linear encoder in the short-stroke vertical vibration exciter.
Figure 6:
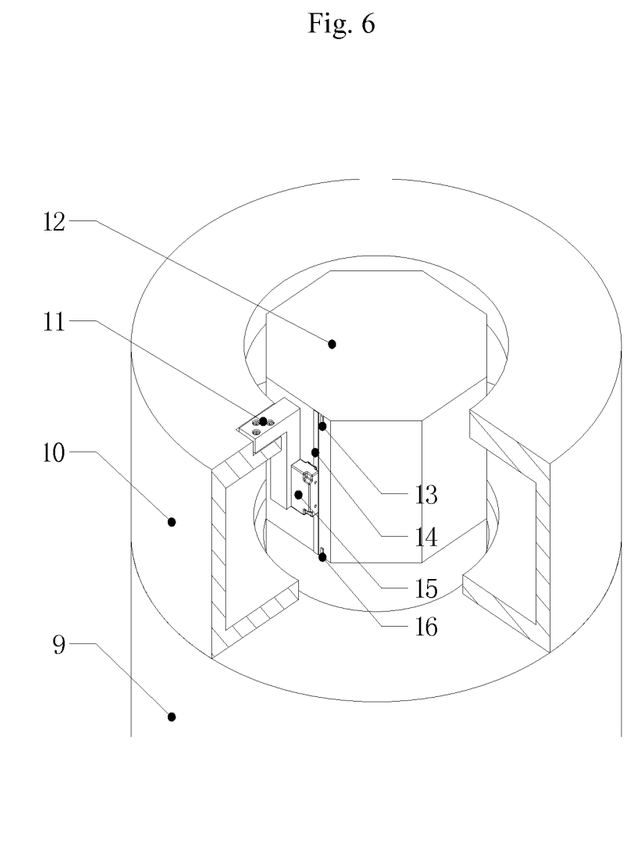
FIG. 6 is a partial cutaway enlarged view of FIG. 5 showing the installation of the optical linear encoder.

Referring to FIGS. 5-6, different from embodiment 1, the scale and the reading head of the optical linear encoder are installed on the moving component and the fixed base of exciter, respectively, for a short-stroke exciter, of which the moving component is longer along the moving orientation than its maximum stroke.

A flat installation surface is processed on the moving component 12 to meet the flatness requirement for the scale installation surface. The reading head 15 is installed on a rail base 10 of a vertical exciter through a bracket 11. The rail base 10 is fixed on the vertical exciter body 9, which is the fixed base of the exciter to ensure the stability of the reading head. A first limit switch actuator 13, a second limit switch actuator 16, a reference mark actuator are installed at proper positions on the two sides of the scale 14. Similarly with embodiment 1, the bracket 11 should be rigid enough to avoid any shaking and its installation orientation can also be adjusted at some extend to improve the measurement accuracy.

The specific embodiments discussed are merely illustrative of specific ways to make and use the invention, and do not limit the scope of the invention. Meanwhile, it should be appreciated that various modifications and their equivalents can be devised by those skilled in the art and will fall within the spirit and scope of the principles of the disclosure.

The invention claimed is:

1. A vibration exciter system with a feedback control unit based on an optical linear encoder comprises a vibration exciter, a signal generator and a power amplifier; characterized in that:

the vibration exciter system further comprises the optical linear encoder converting the displacement of a moving component of the exciter into two pulse signals with a phase difference of 90°, a wave filtering, shaping and level translator unit converting the two pulse signals into a standard pulse signal with standard shape and level, a subdivider and orientation recognizer unit refining the standard pulse signal and recognizing moving orientation of a system being measured, an analog converter unit converting the refined standard pulse signal into analogue signal whose voltage is in proportion to the current displacement of the moving component;

the standard pulse signal outputted by the signal generator and the converted analogue signal are inputted into a subtracter, where the standard pulse is the minuend and the analogue signal is the subtrahend;

the output of subtracter is inputted into the power amplifier and the output of the power amplifier is inputted into the vibration exciter as a driving signal.

2. The vibration exciter system according to claim 1, wherein a PID controller is adopted between the subtracter and the power amplifier; a proportional amplifier is also adopted between the analog converter unit and the subtracter.

3. The vibration exciter system according to claim 2, wherein the first pulse signal has a phase A and the second pulse signal has a phase B, and wherein the moving orientation of the system being measured is recognized through the subdivider and orientation recognizer unit as follows: when phase A leads phase B, the moving orientation of the exciter is set as positive; when phase A follows phase B, the moving orientation of the exciter is set as negative.

4. The vibration exciter system according to claim 3, wherein a scale and a reading head of the optical linear encoder are installed on the moving component and the fixed base of exciter, respectively, for a short-stroke exciter, of which the moving component is longer along the moving orientation than its maximum stroke.

5. The vibration exciter system according to claim 3, wherein a scale and a reading head of the optical linear encoder are installed on the fixed base and the moving component of exciter, respectively, for a long-stroke exciter, of which the moving component is shorter along the moving orientation than its maximum stroke.

6. The vibration exciter system encoder according to claim 4, wherein on one side of the scale is installed a reference mark actuator that provides the measurement reference.

7. The vibration exciter system according to claim 6, wherein on the other side of the scale are installed a first limit switch actuator and a second limit switch actuator between which the moving component is restricted.

8. The vibration exciter system according to claim 5, wherein on one side of the scale is installed a reference mark actuator that provides the measurement reference.

* * * * *